United States Patent
Orr

(10) Patent No.: US 6,430,357 B1
(45) Date of Patent: Aug. 6, 2002

(54) TEXT DATA EXTRACTION SYSTEM FOR INTERLEAVED VIDEO DATA STREAMS

(75) Inventor: Stephen J. Orr, Markham (CA)

(73) Assignee: ATI International SRL, Barbados (KN)

( * ) Notice: Subject to any disclaimer, the term of this patent is extended or adjusted under 35 U.S.C. 154(b) by 0 days.

(21) Appl. No.: 09/158,623

(22) Filed: Sep. 22, 1998

(51) Int. Cl.$^7$ .............................. H04N 5/76; H04N 7/08
(52) U.S. Cl. ................................ 386/69; 386/70; 386/98; 386/111; 348/460; 348/461; 348/468; 348/423.1
(58) Field of Search .......................... 386/1, 4, 45, 46, 386/69, 70, 111, 112, 125, 126, 95, 98; 348/460, 461, 465, 468, 473, 476, 478, 906, 423.1; H04N 5/76, 7/08, 9/79

(56) References Cited

U.S. PATENT DOCUMENTS 5,703,655 A * 12/1997 Corey et al. ................ 348/468
6,263,396 B1 * 7/2001 Cottle et al. ................ 710/263
6,337,947 B1 * 1/2002 Porter et al. ................. 386/55

* cited by examiner

Primary Examiner—Thai Tran
(74) Attorney, Agent, or Firm—Vedder, Price, Kaufman & Kammholz

(57) ABSTRACT

A text data extraction system analyzes one or more interleaved video data streams and parses the stream(s) to extract text data from text data packets. In addition, presentation time data is extracted to facilitate independent use of the text data from corresponding video data. Extracted time coded text data is stored so that the presentation time data can be used to link the extracted text data back to the corresponding video data to facilitate for example: annotation of a movie, text searching of closed caption text, printing transcripts of closed caption text, controlling video playback, such as the order in which scenes are played back, and any other suitable navigation or manipulation of video images or text data.

43 Claims, 5 Drawing Sheets

(NAVIGATION)

TEXT DATA EXTRACTION SYSTEM FOR INTERLEAVED VIDEO DATA STREAMS

CROSS REFERENCE TO RELATED APPLICATION

This application is related to co-pending patent application Ser. No. 09/047,194 entitled "Method and Apparatus for Customized Editing of Video and/or Audio Signals", filed Mar. 24, 1998, by Allen J. Porter et al., and assigned to instant assignee.

FIELD OF THE INVENTION

The present invention relates generally to video and audio processing systems and more particularly to customized navigation of video and/or audio signals from interleaved video data streams having text data packets and presentation time information therein.

BACKGROUND OF THE INVENTION

The entertainment industry is producing an ever increasing number of video and/or audio products for private and public use. Today, a consumer may rent or purchase a movie in a video cassette format, a laser disk format, a DVD format, or the home viewer may rent, or view a movie of the broadcast from a local cable station or from a satellite broadcasting company.

Video and audio processing systems are known which allow a user to scroll through closed caption text data using a windows based user interface to allow a user to search for a particular lines within a movie, advance to a particular scene within a movie, or insert control notations within the movie. However such systems have been developed for video streams that separate the closed caption information from the video information. For example, in the current video CD and closed caption specification, video CD 2.0 closed caption information may be communicated in blocks of separate text data and corresponding time stamp data wherein the time stamp data indicates the time location within the video information for which the corresponding closed caption text should appear. As such, conventional video processing systems store the file containing the block of closed caption information and corresponding time stamps and presents this to a user to allow a user to perform various review and annotation processes if desired.

However, a problem arises with newer DVD systems and other digital systems that use an interleaved video data stream which interleaves text data packets and presentation time data with the video data. Conventional systems are unable to distinguish the video from the text information and appropriately display the closed caption information for a viewer. It would be advantageous if a video and audio processing system could suitably detect the text and time stamp information interleaved with the video data to facilitate navigation from one frame or scene to another based on text data, or rearrange information or insert information such as video frames or closed caption text from the interleaved video stream.

Consequently there exists a need for a method and apparatus that allows detection and extraction of interleaved text information and presentation time information to facilitate navigation, including, but not limited to selective playback or annotation of video and/or audio information.

DETAILED DESCRIPTION OF PREFERRED EMBODIMENTS OF THE INVENTION

The present invention provides a method and apparatus for text data extraction for interleaved video data streams and facilitation of navigation using parsed information. The interleaved video data stream may have, for example, text data packets, presentation time data, such as time stamp information and interleaved video data and audio data. The text data extraction system analyzes the interleaved video data stream and parses the interleaved stream to extract text data from text data packets. In addition, presentation time data is extracted to facilitate independent use of the text data from corresponding video data. Resulting extracted time coded text data is stored so that the presentation time data can be used to link the extracted text data back to the corresponding video data to facilitate, for example, annotation of a movie, text searching of closed caption text, printing transcripts of closed caption text, controlling video playback such as the order in which scenes are played back, and any other suitable navigation or manipulation of video images or text data. The system allows the insertion of annotation or control data that is also linked to time stamped data so that upon playback or other manipulation, the system searches for the annotation code or control data and performs the appropriate process according to the embedded control data at the appropriate time based on the time stamped data.

Where multiple movies may be contained on a DVD disc or other medium, or where multiple storage mediums are being analyzed, the system obtains stream identification data, such as a DVD identification data and links the stream to this data to ensure proper text linkage once the multiple video streams have been analyzed. Preferably, the system analyzes the complete video stream to extract the text data from the interlaced video and stores the entire extracted text in a database for later linkage and manipulation. With such a method and apparatus, video and audio products employing interleaved video data streams may be annotated, navigated or otherwise manipulated based on time presentation data interleaved with the video, and/or based on the text data interleaved in the video data.

Figure 1:
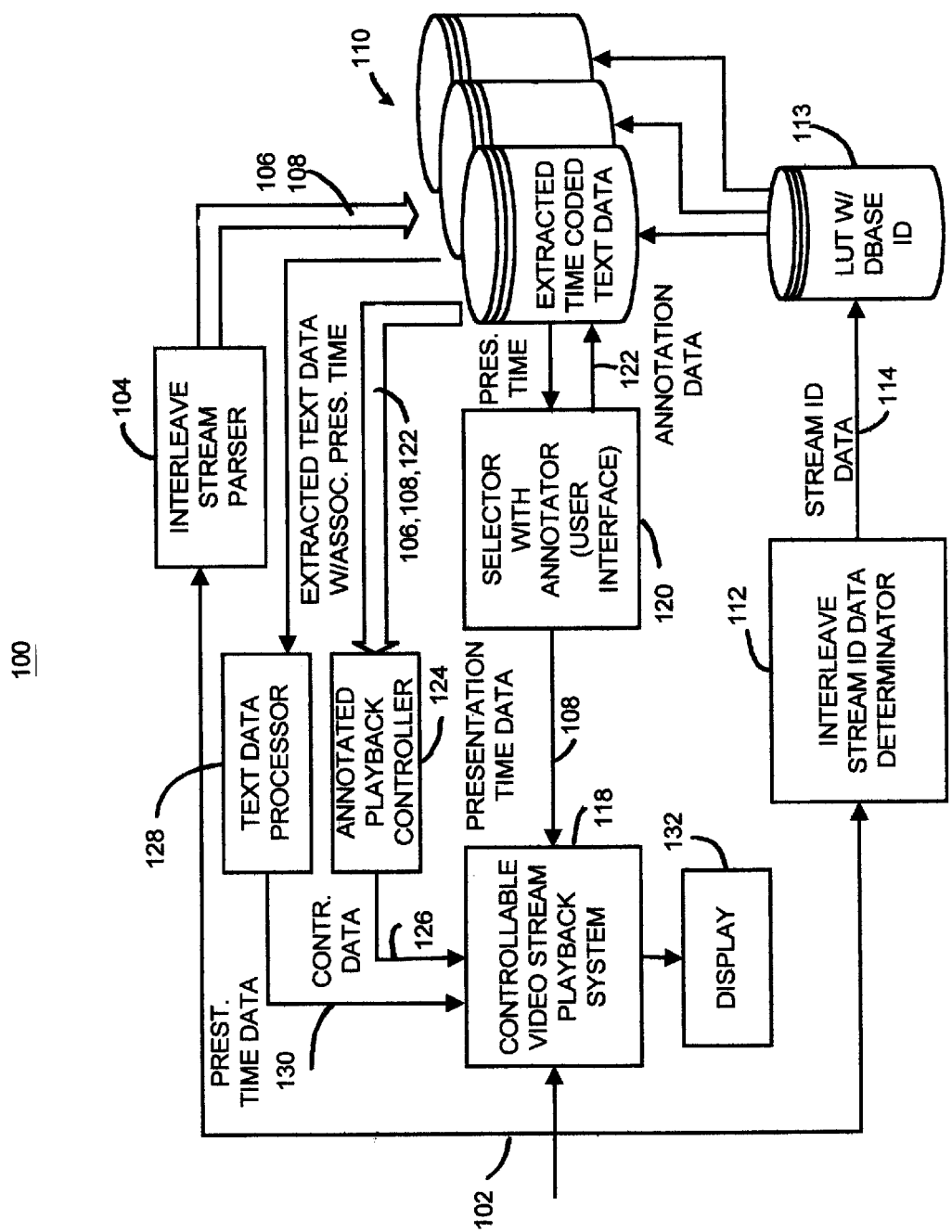
FIG. 1 illustrates a schematic block diagram of a text data extraction system for interleaved video data streams in accordance with one embodiment of the invention.
Figure 2:
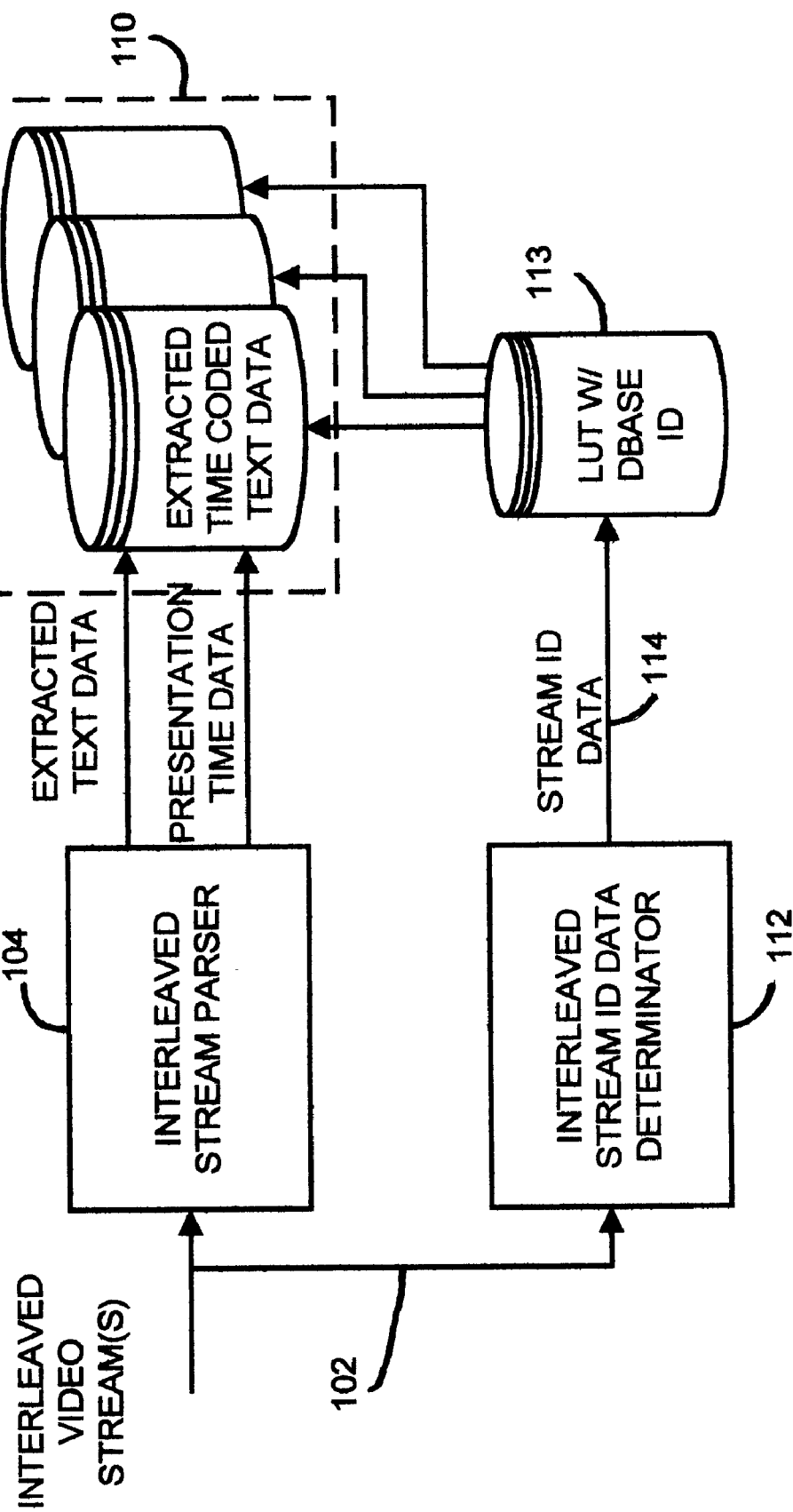
FIG. 2 illustrates a schematic block diagram of a text data extractor as shown in FIG. 1.
Figure 3:
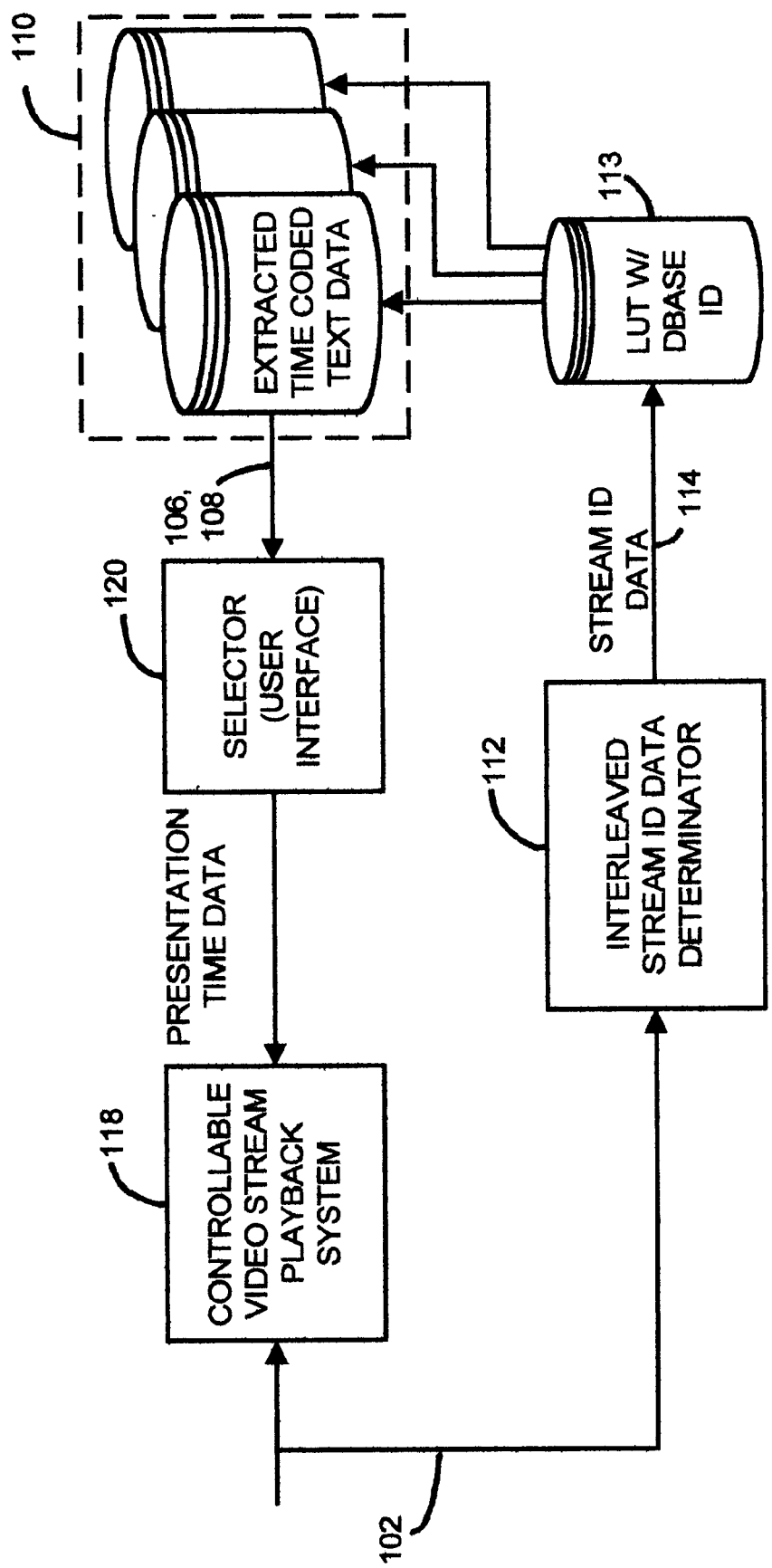
FIG. 3 illustrates a block diagram of one embodiment of a navigation system as shown in FIG. 1.

Referring to FIGS. 1–3, one embodiment of the text extraction system 100 for interleaved video data stream 102 is shown. The interleaved video stream includes text data packets, presentation data and interleaved video data and audio data. The text data extraction system 100 includes an interleave stream parser 104 that receives the interleaved video data stream and analyzes the interleaved stream and extracts text data 106, such as closed caption data and also extracts presentation time data 108, such as time stamp information associated with the text data, to facilitate independent use of text data from the corresponding video data. The text data extraction system 100 also includes memory 110, such as a database or a series of databases, that store the extracted text data 106 and extracted presentation time data 108 so that the presentation time data can be used to link the extracted text data back to the corresponding video data. The memory 110 may be a relational database, object oriented database or any other suitable database which maps extracted time stamp information with corresponding text data from the interleaved video stream. The database 10 stores linked extracted presentation time data 108 such that it links the extracted text data 106 to corresponding video data.

The text data extraction system for interleaved video data streams also includes interleaved stream identification data determinator 112 that receives the interleaved stream 102 and searches for stream identification data. Stream identification data, may be for example, identification data stored on a DVD disc indicating the manufacturer, name of the movie, and other suitable data. The interleaved stream I.D. data determinator 112 determines the stream I.D. data 114 from the interleaved video stream and stores it in a database 113 (which may be the same database as database 110 if desired) in the form of a lookup table, or hash table etc., which maps stream I.D. data 114 for a given movie, for example, to corresponding extracted time coded text data for that movie stored in database 110. The stream identification data 114 may include a digital signature corresponding to a given interlaced stream. The stream identification data may be embedded in the interleaved stream 102 or may be entered by a user through a graphic user interface if desired.

Where multiple movies are analyzed or where multiple streams on one DVD are analyzed, the interleaved stream I.D. data determinator obtains stream ID data for each stream and the interleave stream parser extracts text data for each separate stream. The storage devices 110 and 113 then include stream identification data for a plurality of streams and per stream storage identification data representing stored extracted text data and presentation time data for a plurality of streams.

The interleave stream parser 104 preferably continues to parse an entire interleaved stream prior to allowing navigation to occur. This may be suitable, to allow all of the closed caption text, for example, to be available to a user to allow navigation or annotating at any point within an entire movie. The data when received, is interleaved with packets of, for example, video, audio, navigation and user data. Some or all of these packets include time stamp information. The text data may be in the user data packet, in its own packet, or embedded in the header of the video or audio packets depending on the nature of the interleaved video stream. The text data is parsed and extracted and associated with the current time stamp.

For example, as applied to MPEG-2 DVD video, the system parses line 21 data (closed captioning data) so that it can be used to navigate to a selected scene, play back selected scenes in selected orders or other manipulation. Presentation time stamp data and control data (annotation or control data) is linked with the line 21 data. With conventional DVD systems, typically presentation time data is interleaved with video data. Presentation time data is also logically mapped based on a hierarchy. The hierarchy contains a number of levels which support functions for access the DVD in various units. The units include, for example, Title units which include multiple Chapter units. Typically, a DVD Video disc contains a complete movie within a single Title, but different formats of the same movie may be under the same Title or multiple Titles may be in the same disc if desired. At the lowest level of the hierarchy there are data packs containing interleaved audio, video, subpicture and embedded navigation data which are time stamped. The MPEG-2 video data includes line 21 data in the video packs. The embedded navigation data may be for example data representing the order in which video is to be played when watching a movie, or allows a user to advance to a particular Title or Chapter. Presentation time stamp data is usually sequential within a Title unit but this is not mandatory. To link the extracted time stamp data with corresponding video data, the system identifies where and when in a prestored navigation path (prestored in the DVD) the data exists. The parser evaluates the DVD such as for example, the following data (or subset thereof) in the indicated hierarchical order: Video Title Set data, Title unit data, Part of Title data (Chapter unit), Program Chain data, Cell data (includes user data, e.g., closed caption data) and presentation time data. The parser generates extracted time coded data such as Part of Title data, Program Chain data, Cell data and corresponding presentation time data with an approximate time offset for a given Video Title Set and Title unit. The system uses the data as the search index information. Data such as menu data, theatrical trailers and other data may be discarded. In effect, the parser may completely run through the DVD and store all Cell level video packs and extract corresponding line 21 data therefrom and store associated presentation time stamp data in the database.

The text data extraction system 100 may also include a controllable video playback system 118. The controllable video stream playback system 118 may be any conventional video playback system, such as a consumer player with advanced remote control abilities, software DVD player, a personal computer (PC) based hardware MPEG2 DVD player or a PC based software DVD player.

The text data extraction system 100 includes a selector 120 which may include an annotator. The selector 120 with optional annotator may have a graphic user interface, such as a windows based interface which allows the selection of presentation time data 108 from the extracted time code database 110 to be used to control the video stream playback system 118. For example, a user may wish to select the display of certain frames or scenes based on the time in which they appear in a movie, as such, the selector 120 may receive the presentation time data and the user may select those times for which video should be displayed. The resulting selected presentation time data is then output to the controllable video stream playback system 118 which plays back the associated frames corresponding to the presentation time data. The optional annotator allows a user to add control data 122, such as text or control data that can be linked with corresponding text or presentation time data in the database 110 to control playback or other suitable process. This may be useful for example if a user wishes to further annotate or replace closed caption text within a digital movie. The presentation time 108 of the scenes along with any extracted text data 106 and user annotation control data 122 are retrieved by an annotated playback controller 124 which then sends a suitable control signal 126 to the controllable video stream playback system, or other device, to control the video playback in accordance with the user annotation. The annotator generates annotation data 122 associated with the extracted text data and/or the extracted presentation time data.

As such, in one example, the selector with annotator serves as a navigation engine to selectively play video data based on extracted text data. The control data 126 may include for example, text based control data to control an audio level of an audio play system associated with the video data to mute audio based on selected text. This allows offensive language to be muted during playback. Also, the text based control data may control video playback of the video data by representing the need to generate a video blanking signal or other signal for the playback system.

A user may select text data to be output based on a windows based user interface unit and as such, a text data processor 128 processes selected text from the extracted time coded text data database 110, and based on the selected text data, outputs presentation time data 130 to control the video stream playback system to display the text and/or video associated with the output presentation time data 130. The video stream playback system 118 outputs the video on display 132 as known in the art. Although only several types of information manipulation are shown, such as text data processor 128 and annotated playback controller 124, any suitable navigation engine or manipulation engine may be also be used. Further manipulation techniques may be found for example in co-pending application, Ser. No. 09/047,194 entitled "Method and Apparatus for Customized editing of Video and/or Audio Signals", filed Mar. 24, 1998, by Allen J. Porter et al., assigned to instant assignee and incorporated herein by reference.

Figure 4:
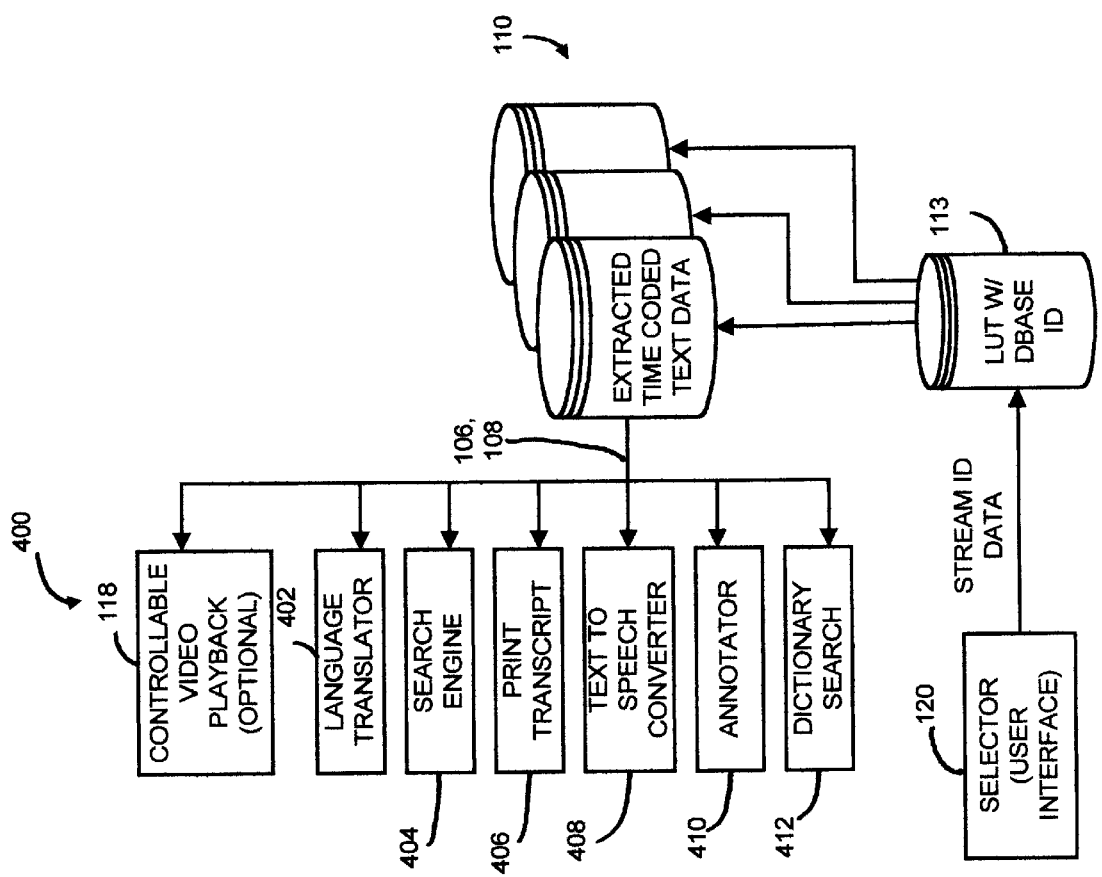
FIG. 4 illustrates a block diagram of a text data extraction system employing a multitude of annotation and navigational devices for use with extracted text data in accordance with one embodiment of the invention.

FIG. 4 is a block diagram illustrating additional navigation and non-navigation engines 400 that may be used with the disclosed system. As shown, a language translator 402 may receive extracted text data 106 and time code data 108 and perform a language translation on the text and outputs the new language text to a controllable video stream playback system. In addition a text search engine 404 may be used to search for selected text that is selected by the search engine. The transcript of the text data may be printed by a transcript print engine 406 and in addition, a text to speech converter may convert the text data 106 into voice data to be output on an audio playback system by a text to speech converter 408. As previously mentioned, an annotator 410 may be used to annotate the video data with additional text data and/or time data to facilitate scene sequencing, or any other suitable manipulation of the video and/or audio data. Also if desired, a dictionary search engine 412 may be used to search selected text data 106 or the entire text stored in the database 110 to search for a particular definition for a selected word. If desired, each of the engines 400 may function across multiple databases 110.

By storing the extracted time coded text data 106 in the database 110, the system 100 facilitates text-based operations independent of corresponding video data. Any suitable navigation system controls video playback, or other video or audio data processing, based on the extracted stored presentation time data such that selected video data is played in response to the stored presentation time data.

Figure 5:
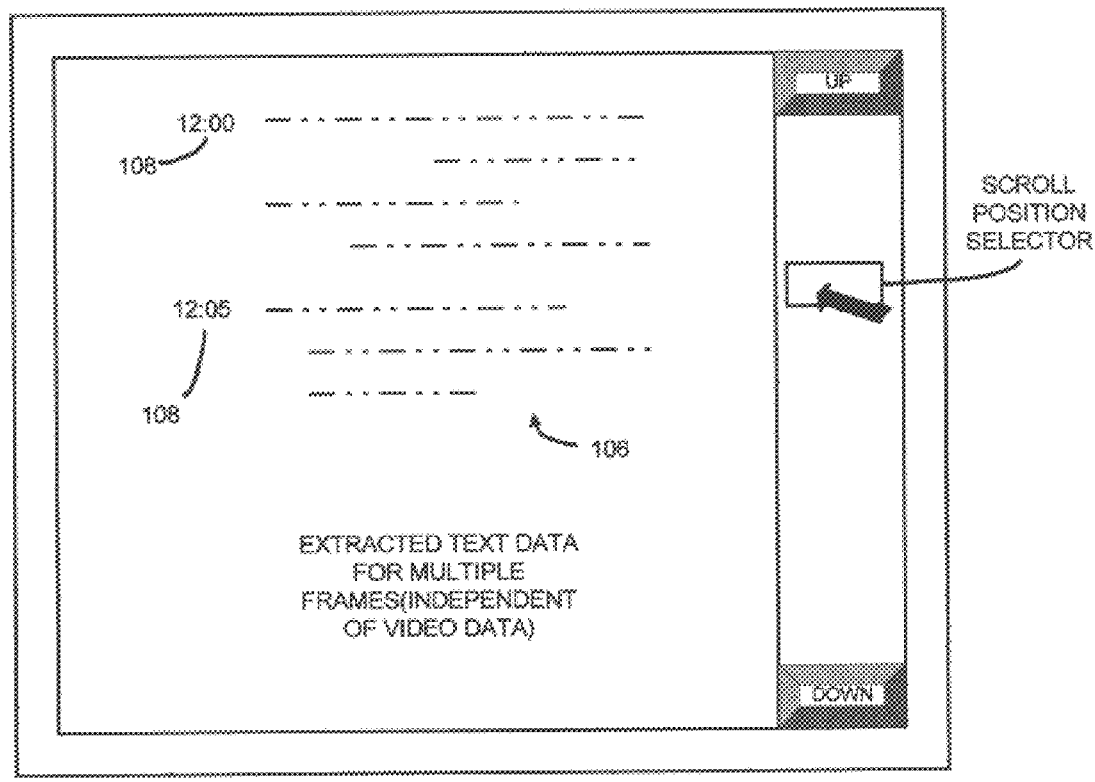
FIG. 5 is a pictorial illustration of a user interface screen to facilitate manipulation of video information based on extracted text data in accordance with one embodiment of the invention.

FIG. 5 specifically represents a GUI interface screen to facilitate manipulation of video information based on extracted text data 106. For example, a user may scroll through displayed extracted text data 106 using a scroll position selector and select the extracted text data 106 and corresponding presentation time data to manipulate video playback, reorganization, audio muting and other aspects as previously mentioned. Moreover, a user may select the extracted text data 106 that corresponds to a start point and end point for video playback to play back only selected video sections in any order.

The systems and methods set forth herein facilitate, among other things, adding of information to source video/ audio information to allow a user to present and access data in new ways. If desired, where the source video is copy protected, the system allows resequencing of scenes, annotation and tagging of scenes to occur, but does not generally allow for recording of protected information. It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A text data extraction system for interleaved video data streams having at least text data packets, presentation time data and interleaved video data, comprising:

parsing means for analyzing the interleaved stream and extracting text data from the text data packets and for extracting the presentation time data to facilitate independent use of the text data from corresponding video data; and means, operatively coupled to the parsing means, for storing extracted text data and the extracted presentation time data such that the presentation time data can be used to link the extracted text data to corresponding video data.

2. The system of claim 1 including means, operatively responsive to the interleaved stream, for linking the interleaved stream to stream identification data.

3. The system of claim 2 wherein the stream identification data includes data representing a digital signature corresponding to a given interleaved stream.

4. The system of claim 2 wherein the stream identification data is embedded in the interleaved stream.

5. The system of claim 1 wherein the text data packets include closed captioned data.

6. The system of claim 1 further including means, responsive to the stored presentation time data, for facilitating navigation among video frames based on the extracted stored presentation time data.

7. The system of claim 6 wherein the parsing means continues to parse an entire interleaved stream prior to allowing navigation to occur by the means for navigating.

8. The system of claim 1 including means for processing the extracted text data to facilitate text based operations independent of corresponding video data.

9. The system of claim 6 wherein the means for navigating includes means for controlling video playback based on the extracted stored presentation time data such that selected video data is played in response to the stored presentation time data.

10. The system of claim 2 wherein the means for linking includes stream identification data for a plurality of streams and per stream storage identification data representing stored extracted text data and presentation time data for a plurality of streams.

11. The system of claim 9 including user selection means for allowing selection of extracted presentation time data for controlling the means for controlling video playback.

12. The system of claim 1 wherein the means for storing stores the extracted presentation time data such that the extracted presentation time data links the extracted text data to corresponding video data.

13. The system of claim 6 wherein the means for navigating includes means for selectively playing video data based on extracted text data.

14. The system of claim 8 wherein the means for processing employs a text search engine using the extracted text data to produce text based control data.

15. The system of claim 14 wherein the text based control data serves to control an audio level associated with the video data.

16. The system of claim 14 wherein the text based control data controls video playback of the video data.

17. The system of claim 1 further including annotation means for generating annotation data associated with at least one of the extracted text data and the extracted presentation time data.

18. The system of claim 8 including a text translator operatively responsive to the extracted text data.

19. A text data extraction system for interleaved video data streams having at least text data packets, presentation time data and interleaved video data, comprising:

parsing means for analyzing the interleaved stream and extracting text data from the text data packets and for extracting the presentation time data to facilitate independent use of the text data from corresponding video data;

means, operatively coupled to the parsing means, for storing extracted text data and the extracted presentation time data such that the presentation time data can be used to link the extracted text data back to corresponding video data;

means, responsive to the stored presentation time data, for facilitating navigation among video frames based on the extracted stored presentation time data; and means for processing the extracted text data to facilitate text based operations independent of corresponding video data.

20. The system of claim 19 including means, operatively responsive to the interleaved stream, for linking the interleaved stream to stream identification data.

21. The system of claim 19 wherein the text data packets include closed captioned data.

22. The system of 20 wherein the parsing means continues to parse an entire interleaved stream prior to allowing navigation to occur by the means for navigating.

23. The system of claim 22 wherein in the means for navigating includes means for controlling video playback based on the extracted stored presentation time data such that selected video data is played in response to the stored presentation time data.

24. The system of claim 20 wherein the means for linking includes stream identification data for a plurality of streams and per stream storage identification data representing stored extracted text data and presentation time data for a plurality of streams.

25. The system of claim 19 including user selection means for allowing selection of extracted presentation time data for controlling the means for controlling video playback.

26. The system of claim 19 wherein the means for storing stores the extracted presentation time data such that the extracted presentation time data links the extracted test data to corresponding video data.

27. The system of claim 20 wherein the means for navigating includes means for selectively playing video data based on extracted text data.

28. The system of claim 19 wherein the means for processing employs a text search engine using the extracted text data to produce text based control data.

29. The system of claim 28 wherein the text based control data serves to control an audio level associated with the video data.

30. The system of claim 29 wherein the text based control data controls video playback of the video data.

31. The system of claim 19 including annotation means for generating annotation data associated with at least one of the extracted text data and the extracted presentation time data.

32. The system of claim 19 including a text translator operatively responsive to the extracted text data.

33. A text data extraction method for interleaved video data streams having at least text data packets, presentation time data and interleaved video data, comprising:

analyzing the interleaved stream, extracting text data from the text data packets and extracting the presentation time data to facilitate independent use of the text data from corresponding video data; and storing the extracted text data and the extracted presentation time data such that the presentation time data can be used to link the extracted text data back to corresponding video data.

34. The method of claim 33 including linking the interleaved stream to stream identification data.

35. The method of claim 34 wherein the stream identification data includes data representing a digital signature corresponding to a given interleaved stream.

36. The method of claim 33 wherein the text data packets include closed captioned data.

37. The method of claim 33 further including the step of navigating among video frames based on the extracted stored presentation time data.

38. The method of claim 37 wherein analyzing includes parsing an entire interleaved stream prior to allowing navigation to occur.

39. The method of claim 37 wherein the step of navigating includes controlling video playback based on the extracted stored presentation time data such that selected video data is played in response to the stored presentation time data.

40. The method of claim 34 wherein linking includes linking stream identification data for a plurality of streams and per stream storage identification data representing stored extracted text data and presentation time data for a plurality of streams.

41. The method of claim 37 wherein navigating includes selectively playing video data based on extracted text data.

42. The method of claim 33 further including generating annotation data associated with at least one of the extracted text data and the extracted presentation time data.

43. The method of claim 33 further including printing interleaved text based on stored extracted text data and corresponding extracted presentation time data.

* * * * *